Patented Dec. 12, 1950

2,533,530

UNITED STATES PATENT OFFICE 2,533,530

PHOTOSENSITIVE COATING CONTAINING RUBBER LATEX

Henry C. Staehle, Rochester, N. Y., assignor to Eastman Kodak Company, Rochester, N. Y., a corporation of New Jersey No Drawing. Application May 3, 1947, Serial No. 745,735

7 Claims. (Cl. 95—7)

This invention relates to the preparation of photographic resist materials and to methods of forming images therein.

In my prior application, Ser. No. 558,346, filed October 12, 1944, I have described a light-sensitive material which may be used as a photosensitive resist. The material consists of a bichromated hydrophilic colloid, such as gelatin or glue, containing an aqueous dispersion of a soft, synthetic resin which dries to a continuous film when the aqueous dispersion alone is coated on glass. The sensitive material may contain a pigment such as titanium oxide and with or without the pigment, when coated onto a support and processed to form a photographic relief image, it may be used as a resist for etching with a light sandblast or with acid or alkali or electrolytically.

I have found that a satisfactory resist material may be prepared by replacing the dispersion of a soft, synthetic resin of the sensitive material described in my prior application, Ser. No. 558,346 with natural rubber latex, which is a dispersion of the natural rubber in an aqueous medium. This material may be processed in the manner described in my prior application, Ser. No. 558,346 to form a relief image and the image after processing is particularly resistant to sandblasting and is especially suitable for use as a sandblast resist.

Example 1

A sensitive composition is made by diluting concentrated natural rubber latex with water and then adding ammonia solution. The diluted ammoniacal latex is considerably more stable than the original latex dispersion. A stabilizing agent is then added to the ammoniacal latex followed by a solution of low-viscosity gelatin and a bichromate sensitizer. The stabilizer may be a dispersion of a soft, synthetic resin such as a dispersion of polymethyl acrylate or polyethyl acrylate in water. The gelatin used in the composition is a lime gelatin which is highly hydrolyzed during manufacture. This gelatin has low viscosity and is referred to as low-grade gelatin. The composition of the mixture is as follows:

| | Cc. |
|---|---|
| Latex (60% solids) | 10 |
| Water | 15 |
| Ammonia hydroxide (concentrated) | 5 |
| Polymethyl acrylate or polyethyl acrylate dispersion | 3 |
| Gelatin (20% solution) | 40 |
| Ammonium bichromate | 2 |

Example 2

A sensitive material may be made similarly to the method described in Example 1 but using a complete bichromate sensitized dispersion of gelatin and acrylate dispersion, in place of the acrylate stabilizer of Example 1. Instead of the acrylate dispersion there is added to the composition of Example 1, 10 cc. of the following mixture.

| | Cc. |
|---|---|
| Polymethyl acrylate or polyethyl acrylate dispersion | 18 |
| Gelatin (20% solution) | 40 |
| Ammonium bichromate | 1 |

Example 3

A sensitive composition may be made as described in Example 1 substituting 5 cc. of a 25% solution of sodium hexametaphosphate for the acrylate dispersion used in the formula of Example 1. This dispersion is not, however, as satisfactory as one containing the acrylate dispersion.

Example 4

The following sensitive composition may be coated directly onto asphalt without the use of a primer, and the resulting image used as a sandblasting resist. The resist is capable of giving good resolution, and has excellent resistance to the abrasive stream. It is useful in decorating glassware and china, and in making high relief printing plates.

| | |
|---|---|
| Buffered Hevea latex | cubic centimeters 75 |
| Water | do 75 |
| Sodium salt of sulfonated hydrocarbons (wetting agent) | cubic centimeters 15 |
| Gelatin (in 133 cc. water) | grams 67 |
| Ammonium bichromate (20% solution) | cubic centimeters 25 |

The resist materials of my invention may be applied to supports of glass, synthetic resin, cellulose ester, steel, aluminum, Bakelite, etc. The composition adheres well to any clean surface, although in some cases it may be desirable to coat the support with a primer before application of the resist material. Primers which may be used include terpentine, coumarone, resins, alkyd resins, plasticized cellulose nitrate, oxidized drying oils, etc.

As in the case of the material of my prior application, Serial No. 558,346, the resist composition of the present invention may be handled in ordinary room light for a reasonable length of time without fogging. The material described in Example 2, when coated on a suitable support, will produce an image of satisfactory density and contrast when exposed to a 150-watt mercury vapor lamp for 15 seconds at a distance of about 10 inches. Exposure to ordinary sunlight for about the same length of time will also produce a satisfactory image.

Development is carried out by immersing in or spraying the exposed material with water. In most cases, water alone is satisfactory although it may be desirable to add a hardening agent such as alum, a swelling agent such as ammonium hydroxide or an acid or solvent to the water. After exposure, development and drying the images produced according to my invention are light-stable and resistant to ordinary handling. They may be removed from the support by the use of abrasives or solvents but do not peel readily once they have become dry.

I claim:

1. A light-sensitive coating composition comprising a mixture of a bichromated gelatin, an aqueous dispersion of natural rubber latex, and a stabilizer selected from the group consisting of aqueous dispersions of polymethyl acrylate and polyethyl acrylate resins and mixtures thereof and sodium hexametaphosphate solutions, said composition being adapted to produce a light-sensitive coating in which a reversal image can be formed by exposure to light and development in an aqueous solution.

2. A light-sensitive coating composition comprising a mixture of a bichromated gelatin, an aqueous dispersion of natural rubber latex, and an aqueous dispersion of a water-insoluble, soft, acrylate resin selected from the group consisting of polymethyl acrylate and polyethyl acrylate and mixtures thereof, said composition being adapted to produce a light-sensitive coating in which a reversal image can be formed by exposure to light and development in an aqueous solution.

3. A light-sensitive coating composition comprising a mixture of a bichromated gelatin, an aqueous dispersion of natural rubber latex and sodium hexametaphosphate, said composition being adapted to produce a light-sensitive coating in which a reversal image can be formed by exposure to light and development in an aqueous solution.

4. The method of making a photographic relief image suitable as a resist for sandblast etching which comprises coating a support which can be etched with a sandblast, with a mixture of a bichromated gelatin, an aqueous dispersion of natural rubber latex and a stabilizer selected from the group consisting of aqueous dispersions of polymethyl acrylate and polyethyl acrylate resins and mixtures thereof and sodium hexametaphosphate solutions, drying said coating, exposing it to an image and washing away the exposed portions of said coating with an aqueous solution to leave said coating in the unexposed portions.

5. The method of making a photographic relief image suitable as a resist for sandblast etching which comprises coating a support which can be etched with a sandblast, with a mixture of a bichromated gelatin, an aqueous dispersion of natural rubber latex and an aqueous dispersion of a water-insoluble, soft acrylate resin selected from the group consisting of polymethyl acrylate and polyethyl acrylate and mixtures thereof, drying said coating, exposing it to an image and washing away the exposed portions of said coating with an aqueous solution to leave said coating in the unexposed portions.

6. A sensitive photographic resist material comprising a support having thereon a mixture of a bichromated gelatin, an aqueous dispersion of natural rubber latex and a stabilizer selected from the group consisting of aqueous dispersions of polymethyl acrylate and polyethyl acrylate resins and mixtures thereof and sodium hexametaphosphate solutions, said composition being adapted to produce a reversal image upon exposure to light and development in an aqueous solution.

7. A sensitive photographic resist material comprising an etchable support having thereon a mixture of bichromated gelatin, an aqueous dispersion of natural rubber latex, and an aqueous dispersion of resin of the group consisting of polymethyl acrylate and polyethyl acrylate and mixtures thereof.

HENRY C. STAEHLE.

REFERENCES CITED

The following references are of record in the file of this patent:

UNITED STATES PATENTS

| Number | Name | Date |
|---|---|---|
| 385,816 | Muller Jacobs | Mar. 1, 1887 |
| 1,574,357 | Beebe | Feb. 23, 1926 |
| 1,981,102 | Hagedorn | Nov. 20, 1934 |
| 2,184,310 | Meigs | Dec. 26, 1939 |
| 2,244,703 | Hubbuck | June 10, 1941 |

OTHER REFERENCES

Eder, Heliogravure and Rotationstiefdruck Ausfuhrliches Handbuch der Photographie, vol. IV, part 3, 3rd ed., 1922, Copy in Div. 67, page 385 particularly cited.